United States Patent [19]
Holden et al.

[11] Patent Number: 5,883,931
[45] Date of Patent: Mar. 16, 1999

[54] CONTROL ROD FOR A NUCLEAR REACTOR HAVING MOUNTING STRUCTURES FOR REPLACING/REARRANGING/INVERTING ABSORBER TUBES

[75] Inventors: James E. Holden; Gary S. Martin; Robert B. Elkins; Dennis D. Kessen; Locksley V. Hampton; Ararat Pogosian; Michael J. Sullivan; Thomas G. Dunlap; Richard E. Kingston, all of Wilmington, N.C.

[73] Assignee: General Electric Company, Schenectady, N.Y.

[21] Appl. No.: 982,023

[22] Filed: Dec. 1, 1997

[51] Int. Cl.[6] ................................................. G21C 7/113
[52] U.S. Cl. ........................... 376/327; 376/333; 376/285
[58] Field of Search .................................. 376/327, 333, 376/335, 285, 224, 239; 976/DIG. 123

[56] References Cited

U.S. PATENT DOCUMENTS

| | | | |
|---|---|---|---|
| 3,945,886 | 3/1976 | Derevyankin et al. | 376/335 |
| 4,285,769 | 8/1981 | Specker et al. | 376/327 |
| 4,676,948 | 6/1987 | Cearley et al. | 376/327 |
| 4,874,574 | 10/1989 | Igarashi et al. | 376/333 |
| 4,882,123 | 11/1989 | Cearley et al. | 376/333 |

*Primary Examiner*—Daniel D. Wasil
*Attorney, Agent, or Firm*—Nixon & Vanderhye

[57] ABSTRACT

A control rod includes four panels in cruciform section each containing a plurality of absorber tubes. The absorber tubes are mounted between upper and lower mounting structures having generally T-shaped slots opening toward one another. The absorber tubes have generally T-shaped end plugs for reception in the slots. The slots and end plugs are configured to permit limited axial movement of each absorber tube relative to the control rod and to adjacent tubes. The absorber tubes are maintained in tension during all nuclear operations including during a scram.

12 Claims, 6 Drawing Sheets

CONTROL ROD FOR A NUCLEAR REACTOR HAVING MOUNTING STRUCTURES FOR REPLACING/ REARRANGING/INVERTING ABSORBER TUBES

TECHNICAL FIELD

The present invention relates to a control rod for a nuclear reactor and particularly relates to mounting structures for absorber tubes, enabling the absorber tubes for free axial movement relative to the control rod, maintaining the absorber tubes in tension during all nuclear operations, including a scram, and enabling ready and easy replacement, rearrangement and/or inversion of absorber tubes.

BACKGROUND

As well known, control rods in nuclear reactors perform dual functions of power distribution shaping and reactivity control. The rods enter from the bottom of the reactor and are typically connected to bottom-mounted, hydraulically actuated drive mechanisms which allow either axial positioning for reactivity regulation or rapid scram insertion. The control rod-to control rod drive connection permits each control rod to be attached and detached from its drive during an outage, for example, during refueling, without disturbing the remainder of the control system for the control rod.

The control rods are generally cruciform in cross-sectional shape, with each panel or wing of the rod containing tubes filled with boron carbide capsules or hafnium rods or empty capsules or combinations of the foregoing. In one particular prior control rod, there are provided a plurality of generally square-shaped absorber tubes welded to one another to form the panels. The tubes, of course, are variously loaded with neutron absorber materials and are fixed in relation to the control rod. In a second form of prior control rods, absorber tubes filled with neutron absorber materials are disposed within sheathing defining the panels or wings of the control rod. The sheathing is welded to the tie rod and to the handle and transition piece at respective opposite ends of the control rod. The absorber tubes are similarly fixed against movement and absorb compressive stresses. In each prior control rod described above, the absorber tubes are connected one to the other and thus are not readily individually replaceable nor is it generally possible to handle the tubes to provide different loadings of neutron absorber material into the various absorber tubes.

In the last-mentioned prior art control rod, the absorber tubes within the sheaths contained $B_4C$ capsules in direct contact with the interior surfaces of the tubes. Thus, after insertion into the nuclear reactor and immediately upon irradiation, the capsules give off helium, which swells the tube and applies a stress and strain to the tube walls, resulting in stress corrosion cracking of the tube. In the first-mentioned prior art control rod described above, the $B_4C$ capsules are inserted into the generally square absorber tubes with clearances between the interior cylindrical surfaces of the tubes and the outer surfaces of the capsules such that, at 40% burn-up, the capsules will engage the walls and initiate stresses and strains within the tubes. While this minimizes stress corrosion cracking, it is only a deferral of the internal pressure build-up to a predetermined time within the life-cycle of the control rod. It is not a solution to the problem of stress within the absorber tubes. That is, there is a mechanical limit for both the foregoing described control rod designs based on the internal pressure and the induced strain in the tube, before the internal pressurization causes the tubes to possibly rupture. Moreover, it will be appreciated that in both of the foregoing described designs, the individual tubes are welded together, thus essentially precluding the possibility of replacement, rearranging or inverting individual absorber tubes or replacing entire absorber tube sections of the various panels. The sheath design also prevents inspection of the absorber tubes while in the reactor.

DISCLOSURE OF THE INVENTION

In accordance with the present invention, there is provided a control rod for a nuclear reactor having mounting structures enabling replacement, repositioning or inversion of the individual absorber tubes at the reactor site. Moreover, the mounting structures provide for free-floating axial movement of the absorber tubes relative to the control rod in the general direction of the axis of the control rod. The mounting structures limit the axial movement of the absorber tubes in such manner as to maintain the tubes in tension throughout nuclear operations. That is, the mounting structures avoid application of any compressive stresses on the absorber tubes during the entire range of nuclear operations. For example, during steady-state operations, the absorber tubes depend from the mounting structure adjacent the upper end of the control rod. Hence, the absorber tubes are in tension as a result of gravity forces. When the control rod is moved vertically, for example, accelerated upwardly during a scram, the loadings caused by the upward acceleration of the absorber tubes are carried by the upper mounting structure, maintaining the absorber tubes in tension. When the control rod decelerates, the absorber tubes, because they are mounted for free axial movement, continue their upward travel under their own inertia until the bottoms of the tubes contact the lower mounting structure stopping decelerating movement and maintaining the absorber tubes in tension. During deceleration, the tube loadings are carried by the lower mounting structure. Thus, during the full range of movement of the control rod, including steady-state scram operations, compressive loadings are not applied to the absorber tubes.

To accomplish the foregoing, the absorber tubes are provided with end plugs having generally T-shaped distal ends for reception in generally complementary T-shaped slots carried by the mounting structures. The slots are elongated in the vertical direction, enabling free-floating axial movement of each absorber tube relative to the control rod and adjacent absorber tubes. Various forms of generally T-shaped mounting configurations may be provided. For example, the end plugs may have a reduced diameter intermediate section terminating in a bulbous end. The mounting structure may have a generally laterally extending key-shaped slot including a complementary bulbous portion and a narrow slot aperture for receiving the respective bulbous and intermediate portions of the end plug. The slot and end plug may also have a rectilinear configuration. Fundamentally, the mounting structures afford free axial movement, while providing stops after limited axial movement, which maintain the absorber tubes in tension at all times.

Another significant advantage of the end plug/slot arrangement for the mounting structure resides in the ability to readily and easily locate the absorber tubes in the control rod, which in turn enables ready and easy replacement, rearrangement or inversion of individual absorber tubes. Thus, each panel or wing of the control rod has upper and lower mounting structures comprising the slots, with the absorber tubes having upper and lower end plugs configured for reception in the slots. By providing a stop on each of the inner ends of the slots of each panel, individual absorber tubes may be laterally displaced along the slots such that the absorber tubes are racked one after the other and against one another in the panels of the control rod. After the final absorber tube has been inserted laterally, the outer ends of the mounting structures are pinned to retain the tubes in the control rod. The tubes are thus free for axial movement, as well as lateral movement to the extent of their accumulated lateral tolerances. Stated differently, the absorber tubes are not connected to one another and are connected for limited free-floating axial movement and lateral movement relative to the mounting structures and the control rod.

The present invention also provides a clearance between the outer diameter of the $B_4C$ capsules and the interior surface of the absorber tubes, dependent upon end of life considerations for the absorber tube. That is, upon irradiation, the $B_4C$ capsules will swell to engage the inner surface of the absorber tube only at the end of life of the absorber tube, hence avoiding the problem of stress corrosion cracking. Additionally, the end gap between the absorber material, either hafnium rods or $B_4C$ capsules, is designed to prevent the impact of the hafnium rod or $B_4C$ capsules against the end plug from breaking the weld seam between the end plug and tube.

In a preferred embodiment according to the present invention, there is provided a control rod for a nuclear reactor, comprising a control rod body having an elongated axis and carrying a plurality of control rod absorber tubes in generally parallel relation to one another and to the axis of the control rod and absorber tube mounting structures carried by the control rod body adjacent opposite ends of the tubes, respectively, and engaging the tubes to secure the tubes to the control rod body and enable free movement of the tubes in a generally axial direction relative to the control rod body.

In a further preferred embodiment according to the present invention, there is provided a control rod for a nuclear reactor, comprising a control rod body having an elongated axis and carrying a plurality of control rod absorber tubes in generally parallel relation to one another and to the axis of the control rod and absorber tube mounting structures carried by the control rod body adjacent opposite ends of the tubes, respectively, and cooperable with the tubes to maintain the tubes in tension when the control rod lies stationary in the nuclear reactor.

In a still further preferred embodiment according to the present invention, there is provided a control rod for a nuclear reactor, comprising a control rod body having an elongated axis and including four panels, each having a predetermined number of control rod absorber tubes in generally parallel relation to one another and to the axis of the control rod, the tubes in each panel being arranged in a vertically extending, side-by-side, generally parallel array of tubes, the panels being disposed about the axis of the control rod and extending in generally orthogonally related lateral directions relative to one another, absorber tube mounting structures carried by the control rod body for each panel and including upper and lower mounting structures, respectively, at least one of the mounting structures for each panel including a slot extending generally laterally of and normal to the control rod axis, each slot having an opening of narrower dimension than a width of the slot, each tube having an end plug with a laterally narrower portion set back from an end portion of the plug, enabling the tubes for lateral movement along the slot of one mounting structure for each panel with the narrower portion of each end plug passing along the opening of one mounting structure for each panel.

In a still further preferred embodiment according to the present invention, there is provided a method of operating a control rod for a nuclear reactor, comprising the step of maintaining control rod absorber tubes carried by the control rod in tension while operating the nuclear reactor, including during a scram.

In a still further preferred embodiment according to the present invention, there is provided a method of operating a nuclear reactor, comprising the step of maintaining control rod absorber tubes of a control rod free for movement in a generally axial direction relative to the control rod during nuclear operations.

Accordingly, it is a primary object of the present invention to provide a control rod having readily replaceable absorber tubes or tubes which can be inverted and which tubes are maintained in tension at all times during nuclear operations.

BEST MODE FOR CARRYING OUT THE INVENTION

Figure 1:
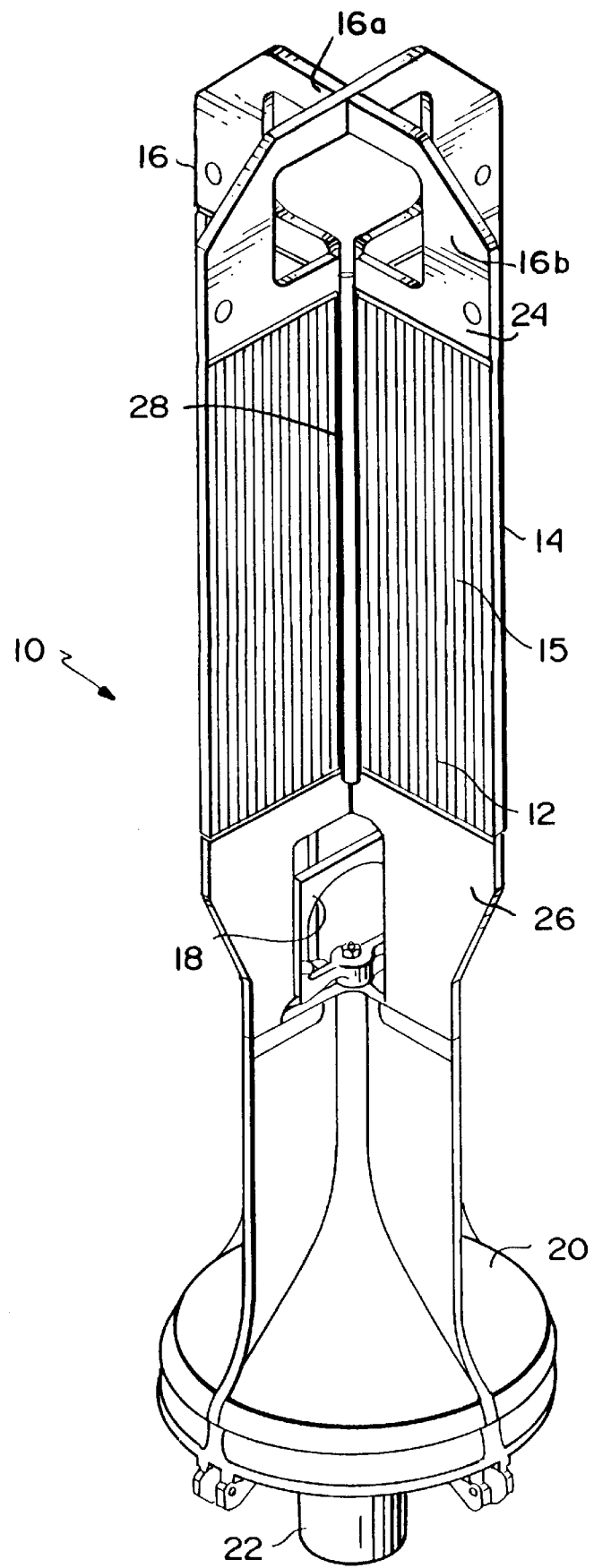
FIG. 1 is a perspective view of a control rod according to the present invention.

Referring now to the drawings, particularly to FIG. 1, there is illustrated a control rod constructed in accordance with the present invention and generally designated 10. The control rod includes a control rod body 12 which is generally cruciform in cross-section to define laterally projecting blades or panels 14 disposed generally at right angles relative to one another. The blades contain neutron absorber tubes 15 for power distribution shaping and reactivity control in the nuclear reactor. The control rod body 12 includes adjacent the lower ends of tubes 15 a latch handle 18 for releasably attaching the control rod to a control rod drive. As will be appreciated, the control rod drive lies below the control rod and serves to raise and lower the control rod within the core of the nuclear reactor. The control rod drive, not shown, terminates at its upper end in a socket 22 below velocity limiter 20. Consequently, the control rod 10 can be detached from the control rod drive by raising the handle 18, all as conventional.

Figure 2:
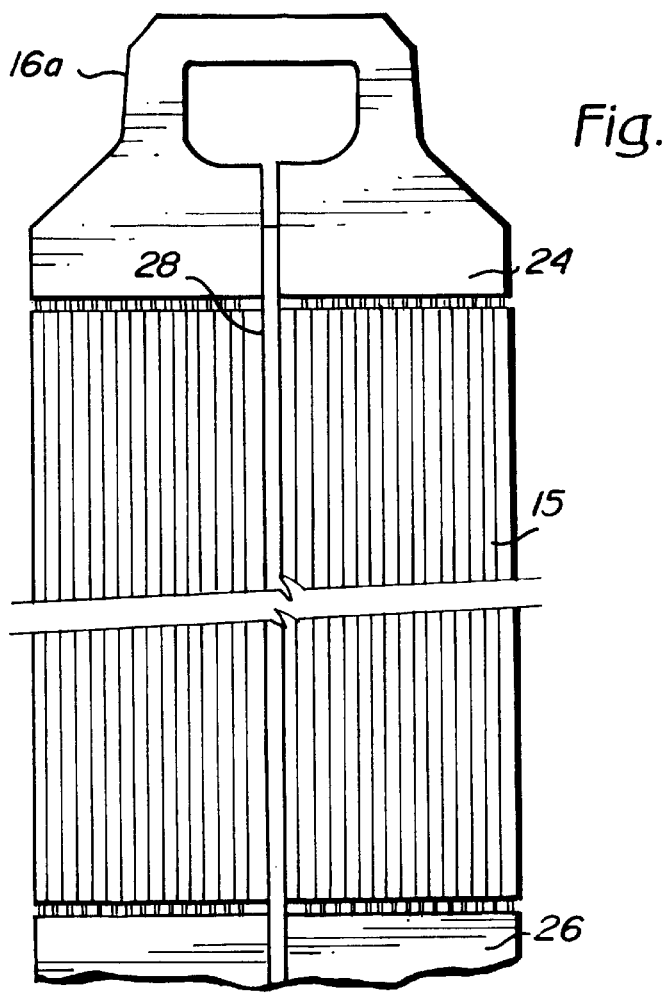
FIG. 2 is an enlarged fragmentary side elevational view of an absorber tube portion of the control rod.
Figure 3:
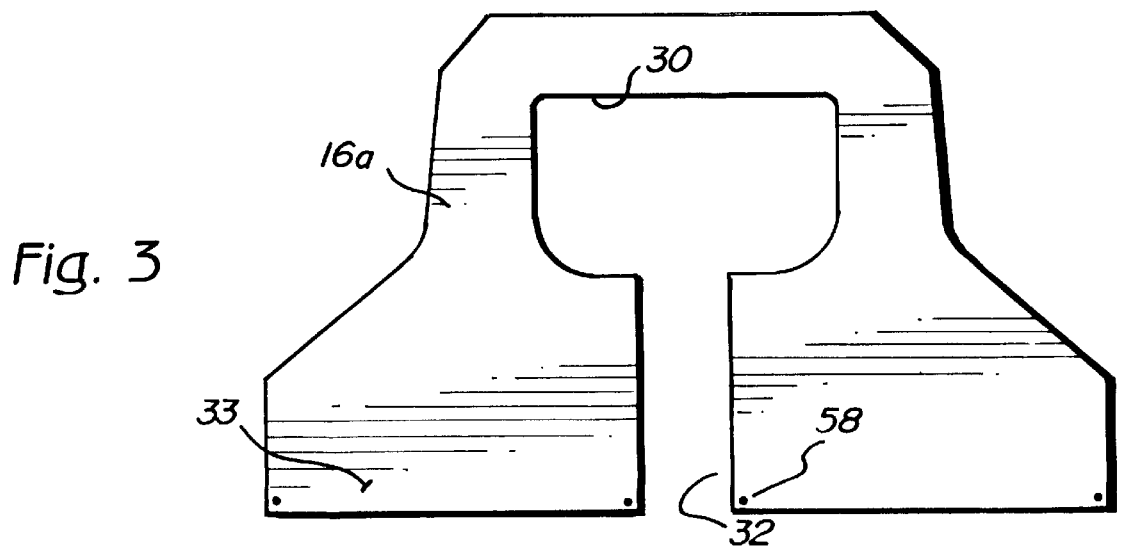
FIG. 3 is an enlarged view of a handle portion of the control rod.

Upper and lower mounting structures 24 and 26, respectively, are provided as part of the control rod body 12 adjacent opposite ends of the absorber tubes 15. The mounting structures are interconnected by a central vertically-extending support member 28 which extends between the mounting structures 24 and 26. The upper mounting structure 24 is supported by the central support member 28, the mounting structure 24 forming part of a pair of handles 16 arranged in a cruciform cross-section. As illustrated in FIGS. 2 and 3, each of the handles 16a and 16b includes a central opening 30 and a slot 32 adjacent base portions 33 of the handle for receiving the upper end of the central support member 28. The base portions 33 flank slot 32. It will be appreciated from the ensuing description that the upper and lower mounting structures 24 and 26 with respect to their connections with the ends of the absorber tubes are identical to one another and, hence, a description of the upper mounting structure will suffice as a description for the lower mounting structure, it being understood that the upper and lower mounting structures are reversed in orientation relative to one another.

Figure 4:
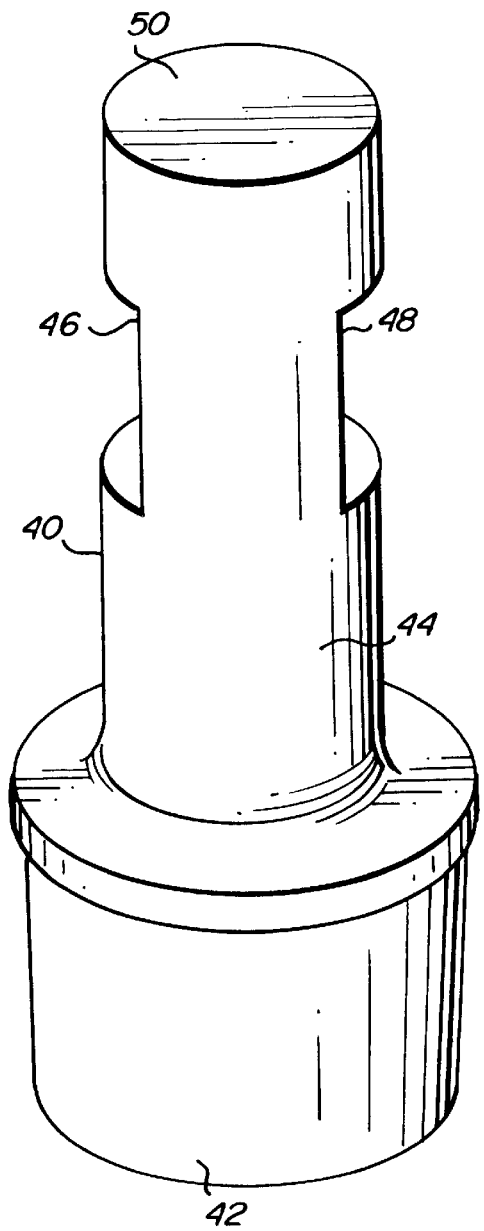
FIG. 4 is an enlarged perspective view of an end plug for an absorber tube.
Figure 5:
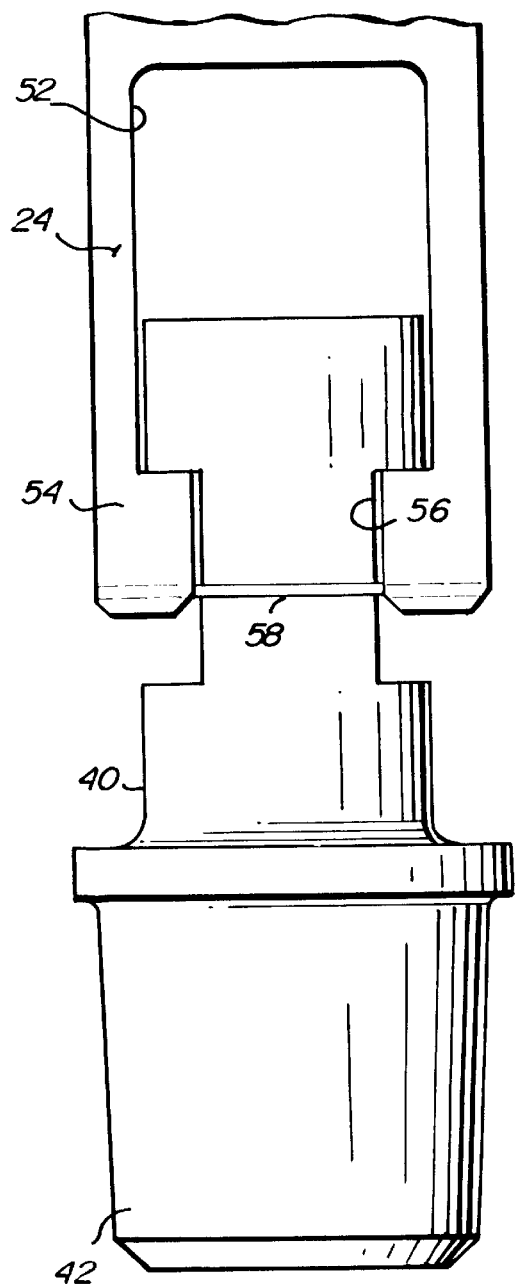
FIG. 5 is a schematic side elevational view of an end plug situate in an upper mounting structure for the absorber tubes.

Referring to FIGS. 4 and 5, there is illustrated an end plug 40 for an absorber tube 15, it being understood that opposite ends of each absorber tube are provided with end plugs 40, respectively. Each end plug 40 includes a base 42 which is received within the cylindrical absorber tube end and welded in place. The outer end of the end plug 40 comprises a reduced diameter cylindrical shaft 44 having a pair of grooves 46 formed along opposite sides of the shaft. The bases 48 of the grooves 46 lie parallel to one another. The grooves 46 are also set back from the distal end 50 of the cylindrical shaft 44.

Referring to FIG. 5, the upper mounting structure 24 forming a part of the base portion 33 of each handle 16 is illustrated. Mounting structure 24 comprises for each wing of the control rod a laterally-extending elongated rectilinear slot 52 which extends between the outer and inner edges of each base portion of the mounting handles. Each mounting structure 24 also includes inwardly directed oppositely disposed flanges 54 which extend the length of slot 52 and define an aperture 56 of narrower dimension than the width of the slot 52. The apertures 52 open toward the absorber tubes. Thus, the end plugs 40 can be slidably received along the slots 52 by engaging the grooves 46 along the flanges 54 with the larger diameter distal ends 50 of the end plugs 40 being received within the slot 52. A series of absorber tubes may therefore be coupled between the upper and lower mounting structures 24 and 26, respectively, by sliding their opposite end plugs along the slots 52 of those structures. As illustrated in FIG. 3, the inner ends of the wings of the handles 16a and 16b of the upper mounting structure 24, as well as the lower mounting structures 26, carry pins 60 which extend across the inner ends of the slots preventing the end plugs from being displaced further inwardly toward support member 28. When a series of absorber tubes are secured between the upper and lower mounting structures 24 and 26, respectively, and racked one against the other to form an absorber tube panel, the outer ends of the mounting structures 24 and 26 may similarly be pinned to retain the absorber tubes racked within the panel.

As illustrated in FIG. 5, the axial extent of the grooves 46 in each of the end plugs 40 is greater than the vertical extent of the flanges 54. Consequently, when the absorber tubes are racked in the mounting structures 24, the upper edges of the grooves 46 of the end plugs 40 bear against the upwardly facing edges of flanges 54 to support the absorber tubes in the panels. At the lower mounting structure 26, the corresponding edges of the end plugs are spaced below the downwardly facing edges of the flanges. In this manner, the absorber tubes are free for axial movement relative to the control rod and to one another as will become clear from the description of the manner of use of the control rod and from the following description of a second embodiment hereof.

Figure 6:
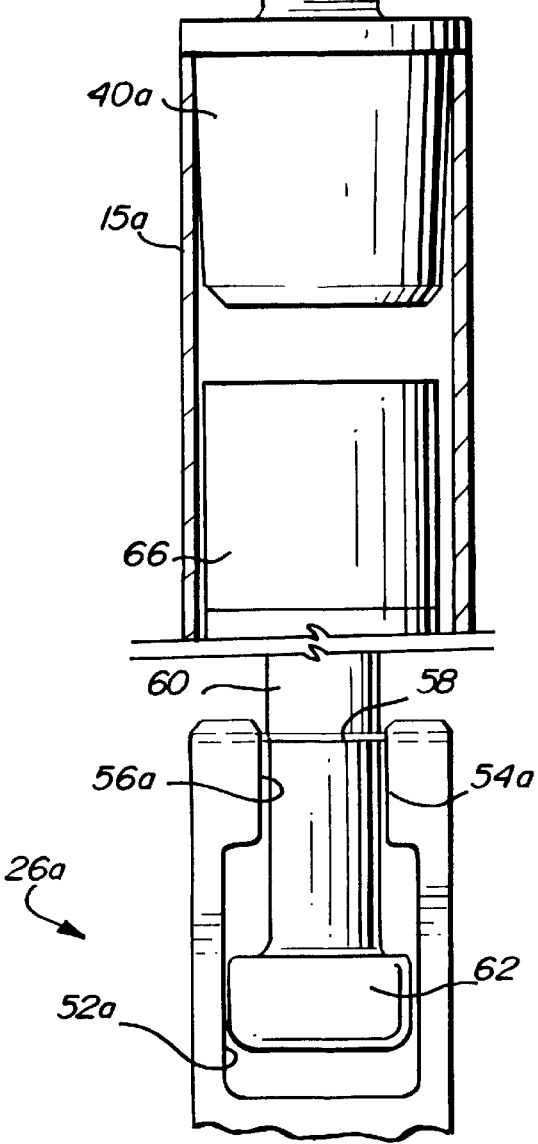
FIG. 6 is a fragmentary cross-sectional view of absorber tube and mounting structures at opposite ends of the absorber tubes illustrating a range of axial movement.
Figure 7:
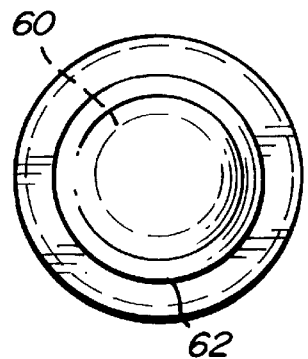
FIG. 7 is an end elevational view of the end plug of the tube of FIG. 6.

Referring to FIGS. 6 and 7, there is illustrated a further form of mounting structures wherein like reference numerals are applied to like parts as in the preceding embodiment, followed by the suffix "a". In this form, each upper mounting structure 24a similarly includes a rectilinear slot 52a defining a lower opening 56a between oppositely facing flanges 54a defining an opening into slot 52a. The end plugs 40a include, however, a reduced diameter cylindrical shank 60 having an enlarged diameter cylindrical head 62. The axial extent of the shank 60 is greater than the distance between the upper and lower edges of the flanges 54a such that the absorber tube 15a can move axially in its mounting between the upper and lower mounting structures 24a and 26a. As in the preceding embodiment, the head 62 of the end plug of the lower mounting structure is spaced from the underface of the flanges 54a when the head 62 of the upper end plug rests on the flanges 54a enabling axial movement of the absorber tube relative to the control rod and adjacent absorber tubes.

Figure 8:
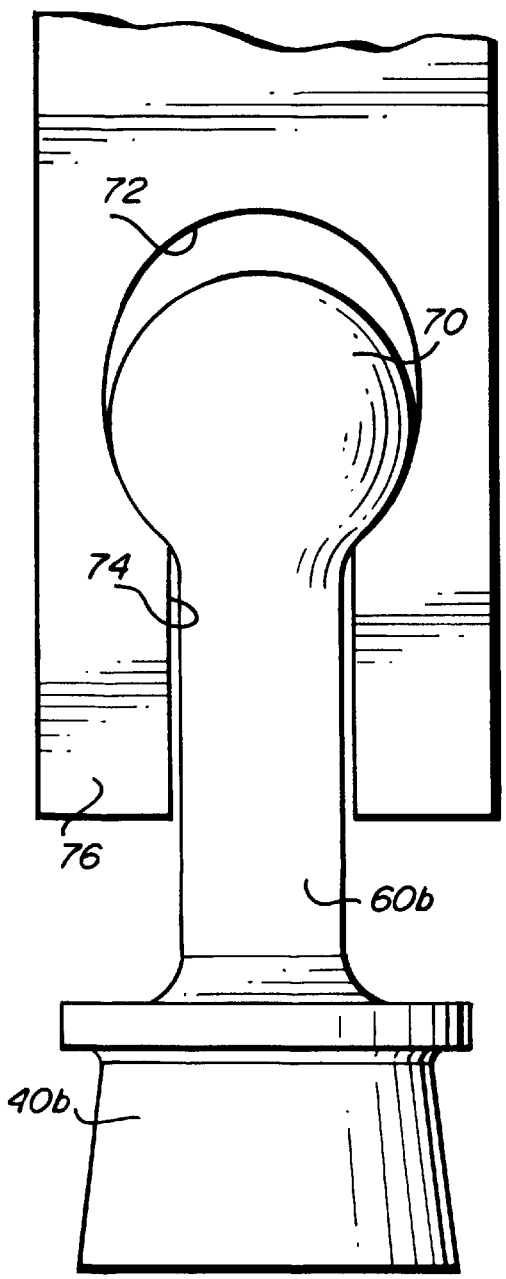
FIG. 8 is a fragmentary enlarged side elevational view of an end plug situate in a mounting structure in a further embodiment of the present invention.
Figure 9:
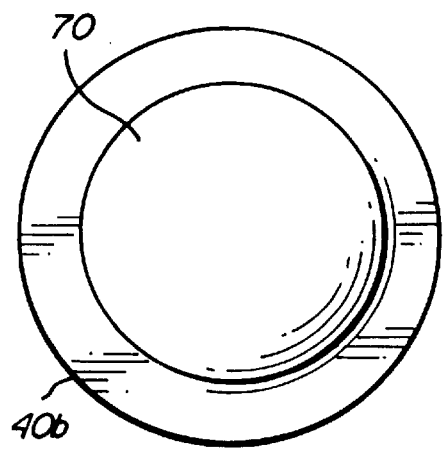
FIG. 9 is an end view of the end plug of FIG. 8.

Referring to the embodiment hereof illustrated in FIGS. 8 and 9 wherein like reference numerals as in the prior embodiments are applied to like parts followed by the suffix "b", there are provided upper and lower mounting structures similarly as described with the opposite ends of the absorber tubes having end plugs 40b secured within the tubes and projecting reduced diameter shanks 60b terminating at distal ends in enlarged diameter spherical balls 70. The slots in the mounting structures may be rectilinear as illustrated in FIGS. 5 and 6 but are preferably arcuate in cross-section in this form of the invention as illustrated in FIG. 8. The slot 72 opens through a reduced width opening 74 defined by flanges 76 for receiving the shanks 60b of the end plugs 40b. As in the preceding embodiments, when the absorber tubes are racked laterally in the panels of the control rod with adjacent tubes bearing against one another, the balls 70 are supported by the flanges 76 of the upper mounting structure. The balls 70 of the lower mounting structure, however, are spaced back from the flanges 76 of the lower mounting structure. In this manner, the absorber tubes are free for limited axial movement relative to the control rod and to one another.

Figure 10:
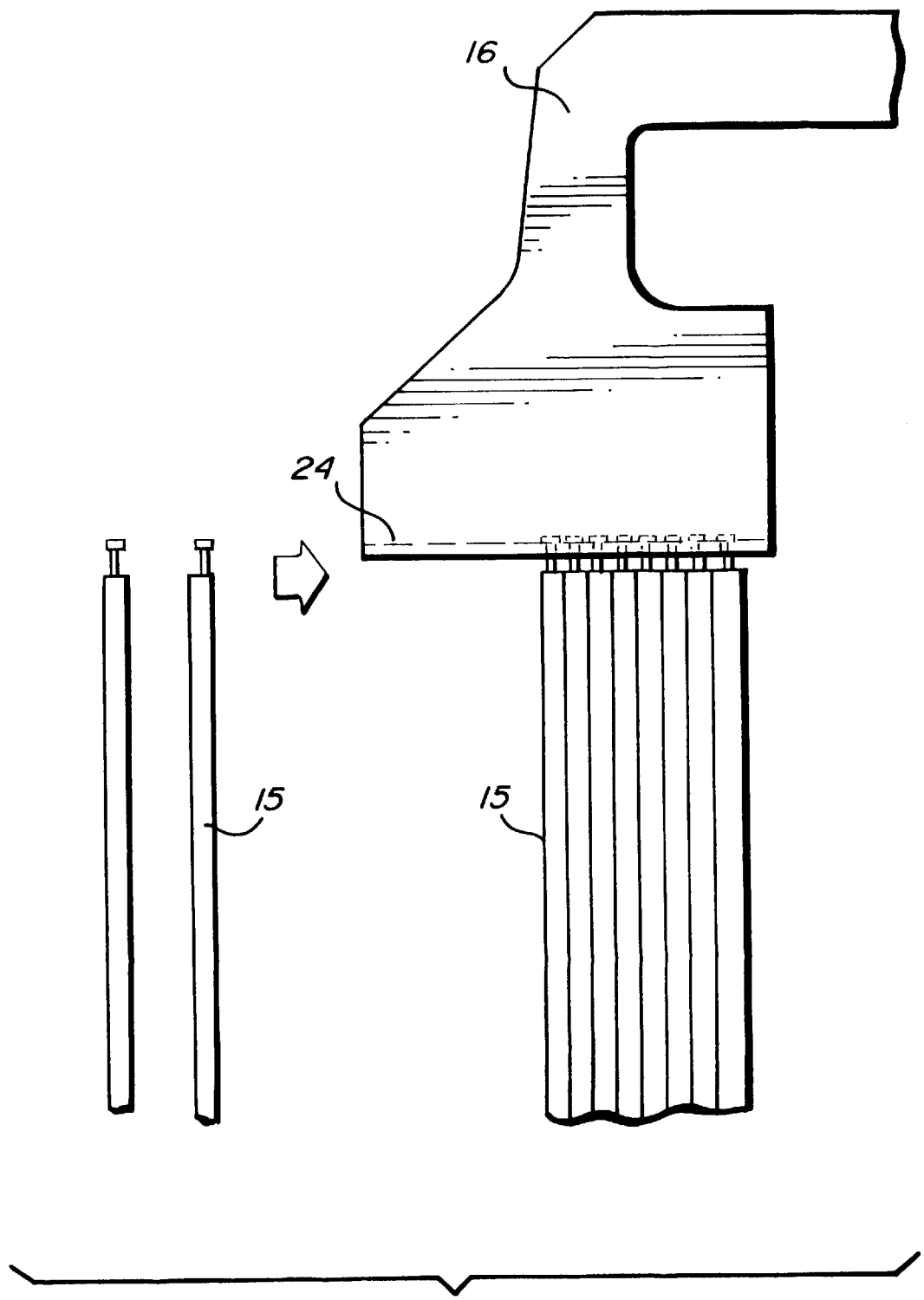
FIG. 10 illustrates the manner of installation of the absorber tubes into the control rod.

Referring now to FIG. 10, there is schematically illustrated the manner of installation of the absorber tubes of the control rod. From the foregoing description, it will be appreciated that the slots along each of the upper and lower mounting structures open laterally outwardly. The end plugs at the opposite ends of the absorber tubes may then be aligned with the respective upper and lower mounting structure slots. Particularly, the reduced portions of the end plugs are aligned with the openings between the flanges of the mounting structures and the enlarged heads of the end plugs aligned with the enlarged widths of the slots of the mounting structures. By displacing the tubes laterally, the end plugs at opposite ends of the absorber tubes may be disposed in the slots with the weight of the absorber tubes being carried by the upper mounting structure. As will be recalled, the inner ends of the slots are closed, for example, by a pin. The absorber tubes are thus racked laterally one against the other to form the panel of absorber tubes for each of the cruciform sections of the control rod. After the final absorber tube has been inserted to complete each panel, the ends of the slots of the upper and lower mounting structures are closed, for example, by disposing pins across the slot openings. In this configuration, the upper mounting structures provide the sole support for the depending absorber tubes. Consequently, the absorber tubes are in tension as they are otherwise unsupported by the lower mounting structures except to the extent of maintaining the absorber tubes coplanar within the panel. The absorber tubes are accordingly free for limited axial movement relative to the control rod and to one another and for lateral movement as a result of an accumulation of tolerances. The tubes are not connected to one another except through the mounting structures.

In use, it will be appreciated that the control rod is disposed vertically between fuel bundles with the fuel bundles being located in the quadrants of the cruciform control rod. As conventional, the control rod is displaceable in a vertical direction for power distribution shaping and reactivity control. During steady state operations, the absorber tubes remain in tension as they depend from the upper mounting structures. The absorber tubes also are maintained in tension during a scram. When the control rod is accelerated upwardly during a scram, the absorber tubes are supported by the upper mounting structure and remain in tension during such acceleration. As the control rod decelerates, the absorber tubes continue to move upwardly as a result of their own inertia and their free floating axial mounting within the mounting structure. At the limit of the axial movement of the absorber tube relative to the control rod during deceleration, the enlarged heads of the end plugs with the slots along the lower mounting structures engage the flanges of the slots preventing further upward movement of the absorber tubes relative to the control rod. This quick decelerating motion similarly maintains the absorber tube in tension until the absorber tubes are displaced by gravity forces to once again be supported by the upper mounting structure in tension. Thus, each absorber tube is maintained in tension throughout all nuclear operations. Compressive stresses are not applied to the absorber tubes.

Referring to FIG. 6, the absorber tubes may contain $B_4C$ capsules 66 or hafnium rods or empty capsules or combinations thereof. In this invention, the spacing between the $B_4C$ capsules and the inner wall surfaces of each tube is initially based on the expected life of the absorber tube such that the outer surface of the $B_4C$ capsule will initially contact or swell to initially contact the interior surface of the absorber tube at approximately its end of life. Stress corrosion cracking as a result of the swelling of the $B_4C$ capsules during use is thus eliminated. Additionally, the neutron absorbing material within the tubes is maintained initially spaced from the end plugs at a distance calculated to reduce or minimize the dynamic loading on the end plug weld during scram conditions.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A control rod for a nuclear reactor, comprising:
   a control rod body having an elongated axis and carrying a plurality of control rod absorber tubes in generally parallel relation to one another and to the axis of the control rod; and
   first and second absorber tube mounting structures carried by said control rod body adjacent opposite ends of said tubes, respectively, and engaging said tubes to secure the tubes to the control rod body and enable free movement of said tubes in opposite generally axial directions relative to said control rod body, said first mounting structure adjacent one end of said tubes engaging and maintaining said tubes in tension when said control rod is accelerated in one axial direction, said second mounting structure adjacent an opposite end of said tubes engaging and maintaining said tubes in tension during deceleration of the control rod following said acceleration in said one direction.

2. A control rod according to claim 1 wherein said first mounting structure adjacent said one end of said tubes maintains said tubes in tension when said control rod lies stationary in the nuclear reactor.

3. A control rod according to claim 1 wherein one of said mounting structures includes an elongated slot extending generally laterally of and normal to said control rod axis, said slot having an elongated aperture of narrower dimension than a width of said slot and opening toward the absorber tubes, each said tube having an end plug with a laterally narrow portion set back from an end portion of said plug, enabling said tubes for lateral movement along said slot of said one mounting structure with said narrow portion of said end plug passing along said aperture of said one mounting structure.

4. A control rod according to claim 1 wherein said first and second mounting structures comprise upper and lower mounting structures, respectively, disposed in vertically spaced relation relative to one another along said control rod with said tubes extending therebetween, each said mounting structure having a stop for limiting the axial movement of each said tube in a direction toward another of said mounting structures whereby during a scram, said tubes depend from said upper mounting structure in tension during upward acceleration of said control rod and extend from said lower mounting structure in tension during deceleration of the control rod following said upward acceleration.

5. A control rod according to claim 1 wherein said control rod body includes a panel of said tubes arranged in a vertically extending, side-by-side generally parallel array of tubes, at least one of said mounting structures including a laterally extending slot for receiving end portions of said tubes, a first stop adjacent one end of said slot whereby said tubes are racked one against the other in said array thereof with the end portions of the tubes received in said slot, and a second stop at an opposite end of said slot for retaining the racked tubes in said array thereof.

6. A control rod according to claim 1 wherein said control rod body includes four panels, each having a predetermined number of tubes arranged in a vertically extending, side-by-side, generally parallel array of tubes, said panels being disposed about the axis of said control rod and extending in generally orthogonally related lateral directions relative to one another and said axis, said first and second mounting structures including for each panel of tubes an upper mounting structure and a lower mounting structure, respectively, disposed in vertically spaced relation relative to one another along said control rod with said tubes extending therebetween, each said mounting structure having a stop for limiting the axial movement of each said tube in a direction toward another of said mounting structures whereby during a scram, said tubes depend from said upper mounting structure in tension during upward acceleration of said control rod and extend from said lower mounting structure in tension during deceleration of the control rod following said upward acceleration.

7. A control rod according to claim 1 wherein said control rod body includes four panels each having a predetermined number of said tubes arranged in a vertically extending, side-by-side, generally parallel array of tubes, said panels being disposed about the axis of said control rod and extending in generally orthogonally related lateral directions relative to one another and said axis, said first and second mounting structures including for each panel of tubes an upper mounting structure and a lower mounting structure, respectively, disposed in vertically spaced relation relative to one another along said control rod with said tubes extending therebetween, at least one of said upper and lower mounting structures including a laterally extending slot for receiving end portions of said tubes, a first stop adjacent one end of said slot whereby tubes are racked one against the other in said array thereof with the end portions of the tubes received in said slot and a second stop at an opposite end of said slot for retaining the racked tubes in said array thereof.

8. A control rod for a nuclear reactor, comprising:

a control rod body having an elongated axis and carrying a plurality of control rod absorber tubes in generally parallel relation to one another and to the axis of the control rod; and first and second absorber tube mounting structures carried by said control rod body adjacent opposite ends of said tubes, respectively, and cooperable with said tubes to maintain said tubes in tension when said control rod lies stationary in the nuclear reactor, first said mounting structure adjacent one end of said tubes maintaining said tubes in tension when said control rod is accelerated in one axial direction, said second mounting structure adjacent an opposite end of said tubes maintaining said tubes in tension during deceleration of the control rod following said acceleration in said one direction.

9. A control rod according to claim 8 wherein said control rod body includes four panels, each having a predetermined number of tubes arranged in a vertically extending, side-by-side, generally parallel array of tubes, said panels being disposed about the axis of said control rod and extending in generally orthogonally related lateral directions relative to one another, said first and second mounting structures including for each panel of tubes an upper mounting structure and a lower mounting structure, each said upper and lower mounting structure, respectively, including a laterally extending slot for receiving end portions of said tubes, a first stop adjacent one end of said slot in each mounting structure whereby said tubes are racked one against the other in said array thereof with end portions of the tubes received in said slots and a second stop at an opposite end of each of the slots of the upper and lower mounting structures for each panel for retaining said racked tubes in said array thereof.

10. A control rod according to claim 8 wherein said control rod body includes four panels, each having a predetermined number of absorber tubes arranged in a vertically extending, side-by-side, generally parallel array of tubes, said panels being disposed about the axis of said control rod and extending in generally orthogonally related lateral directions relative to one another and said axis, said first and second mounting structures including for each panel of tubes an upper mounting structure and a lower mounting structure, respectively, disposed in vertically spaced relation relative to one another along said control rod with said tubes extending therebetween, each said mounting structure having a stop for limiting the axial movement of each said tube whereby during a scram, said tubes depend from said upper mounting structure in tension during upward acceleration of said control rod and extend from said lower mounting structure in tension during deceleration of the control rod following said upward acceleration.

11. A method of operating a control rod for a nuclear reactor, comprising the step of:

maintaining control rod absorber tubes carried by said control rod in tension throughout their lengths while operating the nuclear reactor, including during acceleration and deceleration following the acceleration of the control rod during a scram.

12. A method of operating a nuclear reactor, comprising the step of:

maintaining control rod absorber tubes of a control rod free for movement in generally opposite axial directions relative to said control rod during nuclear operations; and maintaining said absorber tubes in tension during nuclear reactor operations, including during acceleration and deceleration following the acceleration of the control rod during a scram.

* * * * *